(12) United States Patent
Hebuterne et al.

(10) Patent No.: US 8,240,784 B2
(45) Date of Patent: Aug. 14, 2012

(54) FLEXIBLE GLOVE HOLDER USED IN THE OPENING OF A GLOVE BOX

(75) Inventors: Francis Hebuterne, Piolenc (FR); Pierre Riba, Sauveterre (FR)

(73) Assignee: Areva NC, Paris (FR)

( * ) Notice: Subject to any disclaimer, the term of this patent is extended or adjusted under 35 U.S.C. 154(b) by 381 days.

(21) Appl. No.: 12/442,447

(22) PCT Filed: Oct. 4, 2007

(86) PCT No.: PCT/EP2007/060532
§ 371 (c)(1),
(2), (4) Date: Apr. 7, 2009

(87) PCT Pub. No.: WO2008/040775
PCT Pub. Date: Apr. 10, 2008

(65) Prior Publication Data
US 2010/0039004 A1    Feb. 18, 2010

(30) Foreign Application Priority Data
Oct. 5, 2006 (FR) ...................................... 06 54116

(51) Int. Cl.
*B25J 21/02* (2006.01)
(52) U.S. Cl. ............... 312/1; 24/1; 2/270; 976/DIG. 363
(58) Field of Classification Search ............ 24/457, 24/370, 458, 570, 545, 904, 907, 1; 312/1; 55/385.2; D24/234; 376/287; 2/270; 250/516.1; 223/111; 976/DIG. 363
See application file for complete search history.

(56) References Cited

U.S. PATENT DOCUMENTS

| | | | | |
|---|---|---|---|---|
| 792,556 A | * | 6/1905 | Reichert | 24/182 |
| 881,461 A | * | 3/1908 | Craig | 24/200 |
| 1,924,132 A | * | 8/1933 | Santsaver | 24/532 |
| 2,278,153 A | * | 3/1942 | Shaulson | 24/200 |
| 2,438,101 A | * | 3/1948 | Wright | 24/129 B |
| 3,218,686 A | * | 11/1965 | Rubenstein | 24/198 |
| 3,323,846 A | | 6/1967 | Boddy | |
| 3,541,648 A | * | 11/1970 | Fortin et al. | 24/1 |
| 3,698,778 A | * | 10/1972 | Townsend et al. | 312/1 |
| 4,010,588 A | * | 3/1977 | Eisert | 52/204.593 |
| 4,141,609 A | * | 2/1979 | Eisert | 312/1 |

(Continued)

FOREIGN PATENT DOCUMENTS

EP    0 549 450 A1    6/1993

(Continued)

OTHER PUBLICATIONS

International Search Report.

*Primary Examiner* — Robert J Sandy
*Assistant Examiner* — Rowland D Do
(74) *Attorney, Agent, or Firm* — Pearne & Gordon LLP

(57) ABSTRACT

The flexible glove holder (1) includes a flat structure (13) with three branches (2, 3 and 4) forming an S-shape on which the glove is wound. The holder (1) is then pushed into the opening of the glove box. This rapid action method makes it possible to avoid knotting the gloves when they must be drawn toward the outside for an operation within the box and also allows the implementation of biological protection on the opening of the glove box as well as a protection of the agents against radiation.

8 Claims, 2 Drawing Sheets

U.S. PATENT DOCUMENTS

| | | | |
|---|---|---|---|
| 5,299,243 A | * | 3/1994 | Picco ............................ 376/287 |
| 5,562,593 A | * | 10/1996 | Sammel ........................ 588/261 |
| 5,732,449 A | * | 3/1998 | Nelson et al. .................. 24/200 |
| 5,990,402 A | * | 11/1999 | Epstein ........................ 84/422.3 |
| 6,193,117 B1 | * | 2/2001 | Poschelk ....................... 223/111 |
| 2004/0064925 A1 | * | 4/2004 | Muller et al. ................... 24/545 |

FOREIGN PATENT DOCUMENTS

| | | |
|---|---|---|
| FR | 2 741 745 A1 | 5/1997 |
| JP | 08-050197 A | 2/1996 |

* cited by examiner

FLEXIBLE GLOVE HOLDER USED IN THE OPENING OF A GLOVE BOX

BACKGROUND OF THE INVENTION

1. Field of Invention

The object of this invention is a flexible glove holder used in the opening of a box where the glove is installed. Glove boxes are commonly used in the nuclear, pharmaceutical and other industries where hazardous products must be handled without direct contact but through a wall.

2. Description of Related Art

This holder can be used under certain circumstances where significant development work is done in the glove box and requires that the gloves be pulled toward the outside in order to avoid risks of their tearing. The current procedure consists of knotting the gloves after pulling them out of the box in order to retain them. It is disadvantageous in that the knot can damage the glove, and in that a pocket of contaminated air appears on the outside and can cause accidents or other damages either by radiation, or in case of leak following a sealing defect. This risk is even more significant in that the pocket of air may be compressed during knotting up to a pressure greater than the ambient pressure, contrary to the normal situation in a glove box where ventilation maintains depressurization.

BRIEF SUMMARY OF THE INVENTION

The holder according to the invention is a new type of means: in order to conveniently maintain a flexible glove on a glove box opening without the need to form a knot, and therefore avoiding the abovementioned drawbacks. Furthermore, the placement of the glove on the holder and the installation of the holder in the opening of the box are quick, which keeps the dose of radiation received by the operator at a very low level, and the glove remains very stable on the holder after placement.

This holder is characterized in that it comprises a flat structure with three essentially parallel branches, one of the branches being a central branch and the two other branches being side branches, the central branch being connected by its opposite ends to each of the side branches, respectively, and legs radiating outward from the structure and designed to be placed on the opening of the glove box.

Other aspects and advantages of the invention will be mentioned later.

BRIEF DESCRIPTION OF THE DRAWINGS

The invention will now be described in connection with the following figures, for which

DETAILED DESCRIPTION OF THE INVENTION

Figure 1:
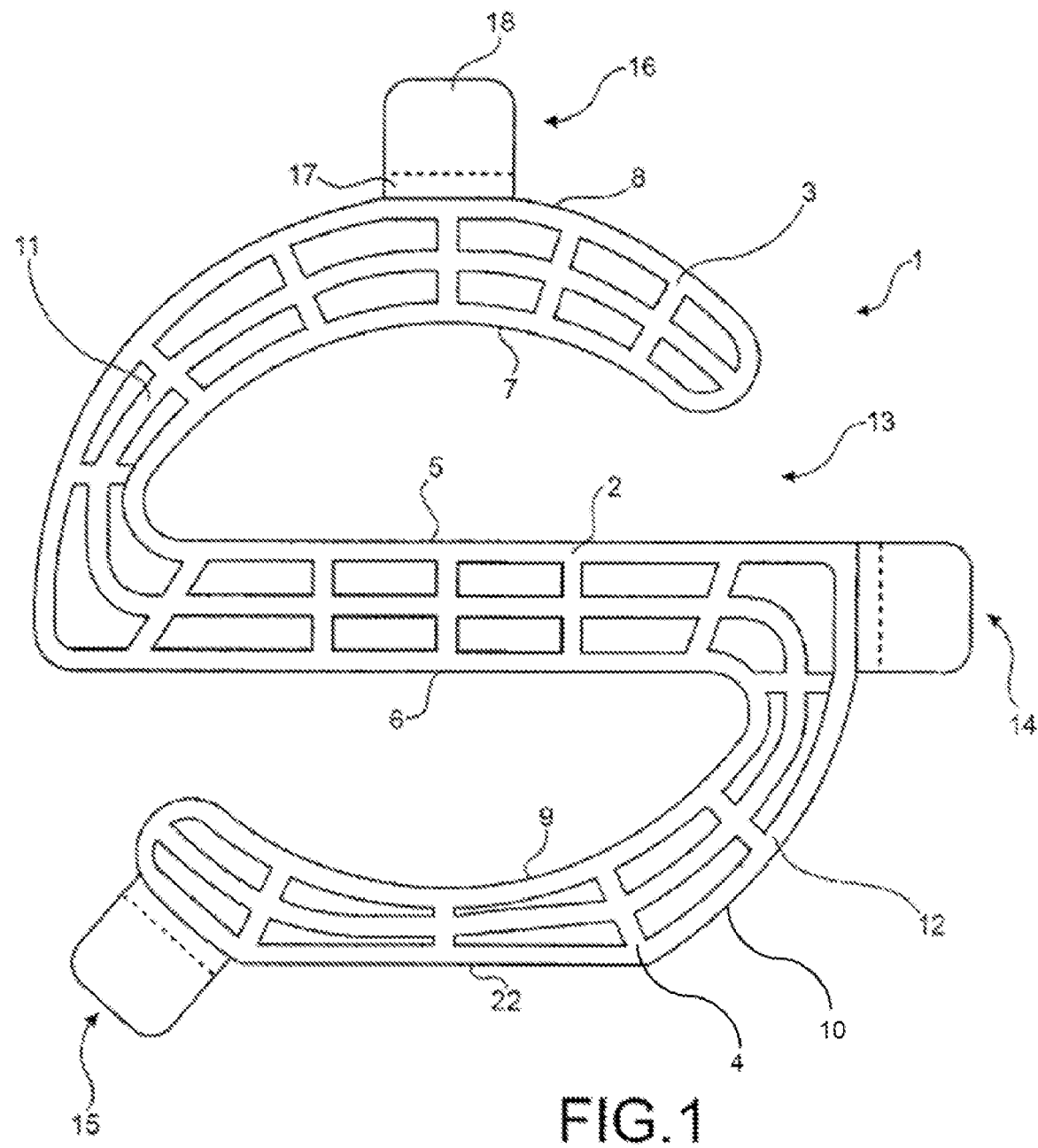
FIG. 1 is a front view of the holder and FIG. 2 is a view illustrating the placement of the body and the installation of the holder in the opening of the glove box.
Figure 2:
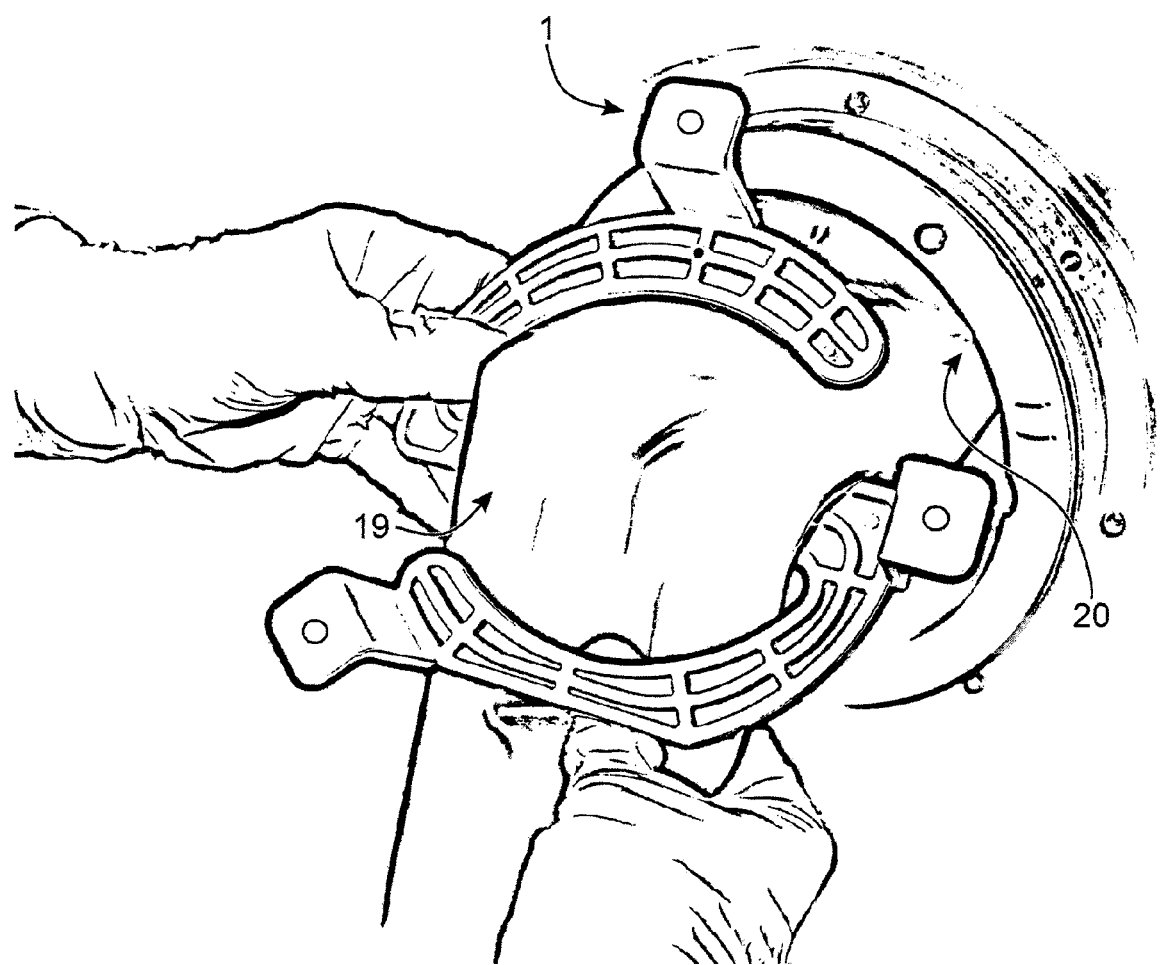

The holder illustrated in FIG. 1 bears the reference 1. It comprises a flat structure 13 made up of three essentially parallel branches including one central branch 2, a first side branch 3 and a second side branch 4. The central branch 2 is provided with two parallel edges 5 and 6, the first side branch 3 with one concave inner edge 7 and one convex outer edge 8, and likewise the second side branch 4 is provided with one concave inner edge 9 and one convex outer edge 10, but with a large central flat section 22. The side branches 3 and 4 are provided with thin regions 11 and 12 with connections to the central branch 2. The connections of the side branches 3 and 4 to the central branch 2 are done at opposite ends thereof, which gives the structure 13 a general S-shape.

The holder 1 also comprises three legs 14, 15, 16 designed for the installation of the holder 1 on a glove box opening. Each of the legs 14, 15 and 16 comprises a portion 17 connected to the structure 13 and extending perpendicularly thereto, and a stop portion 18 parallel to the structure 13 which is attached to the opposite end of the first portion 17. The stop portions radiate toward the outside of the holder 1.

The other figure illustrates the use of the holder 1. Brought close to it is a glove 19 covering a glove box opening 20. The holder 1 is placed in front of the opening 20, the glove 19 is drawn toward the outside and successively wound over a series of branches 2, 3 and 4. Significant friction surfaces appear between stacked lengths both touching the glove 19 and through contact of the glove 19 with the branches 2, 3 and 4. When a sufficient surface of the glove 19 is surrounding the holder 1, it is held in place and the holder 1 can be pushed back into the opening 20 until the stop portions 18 are touching the opening 20. The glove is also pushed back into the opening 20, is not exposed to the outside and remains protected from damage. Its gaseous content remains hidden and does not cause any risk for the environment if it is radioactive.

In the illustrated example, we have first wound the glove 19 around the central branch 2, then the second side branch 4 at the location of the flat part 22, and lastly the first side branch 3 before pushing its free end toward the glove box.

The legs 14, 15 and 16 are arranged at comparable, but different angular distances. The first leg 14 is the extension of the central branch 2, for connection to the second side branch 4, the second leg 15 is at the end of the second side branch 4 and the third leg 16 is in the middle of the first side branch 3. The legs 14, 15 and 16, the concave edges 7 and 9, the flat section 22 and the connections between the branches at opposite ends of the central branch 2 prevent sliding of the glove 19 assembly on either side, since the legs and their opposing connections as well as the concave edges keep the glove 19 wound in them. This lateral sliding would have been the main risk of detachment of the holder 1; it is thereby eliminated.

The structure 13 is contained in the section of the opening 20 of the glove box with little play. The volume of the glove 19 keeps the holder 1 in place in the opening 20 in a substantially centered position when it has been pushed in, and opposes an involuntary fall.

What is claimed is:

1. An assembly comprising:
   a glove box with an opening; and
   a glove holder including
      a flat structure with three essentially parallel branches, one of the branches being a central branch and the other two branches being side braches, the central branch being connected at opposite ends thereof to each of the side braches, respectively; and
      legs extending outwardly from the flat structure and adapted to be placed on the opening of the glove box.

2. The assembly according to claim 1, further comprising a glove in the opening of the glove box.

3. The assembly according to claim 1, wherein at least one of thelegs includes a portion essentially perpendicular to a plane in which the flat structure extends,and a portion essentially parallel to the plane, wherein the essentially parallel portion is astop portion on the opening.

4. The assembly according to claim 3, wherein the essentially parallel portion of the at least one leg is on a different plane than the flat structure.

5. The assembly according to claim 1, wherein at least one of the side branches has a convex outer edge.

6. The assembly according to claim 1, wherein at least one of the branches has a thin region.

7. The assembly according to claim 1, wherein at least one of the side branches has a concave inner edge.

8. The assembly according to claim 1, wherein there are three legs, one extending from the central branch, another located at a free end of one of the side branches, and a third located at a central portion of another of the side branches.

* * * * *

UNITED STATES PATENT AND TRADEMARK OFFICE
CERTIFICATE OF CORRECTION

| | | |
|---|---|---|
| PATENT NO. | : 8,240,784 B2 | Page 1 of 1 |
| APPLICATION NO. | : 12/442447 | |
| DATED | : August 14, 2012 | |
| INVENTOR(S) | : Francis Hebuterne | |

It is certified that error appears in the above-identified patent and that said Letters Patent is hereby corrected as shown below:

In column 2 line 61, claim 3, please delete "thelegs" and insert therefor --the legs--.

In column 2 line 64, claim 3, please delete "astop" and insert therefor --a stop--.

Signed and Sealed this
Twenty-third Day of October, 2012

David J. Kappos
*Director of the United States Patent and Trademark Office*